(12) United States Patent
Ikeda (10) Patent No.: US 8,827,680 B2
(45) Date of Patent: Sep. 9, 2014

(54) LIQUID RESIN MATERIAL MOLDING SYSTEM

(75) Inventor: Toru Ikeda, Nagano (JP)

(73) Assignee: Nissei Plastic Industrial Co., Ltd. (JP)

( * ) Notice: Subject to any disclaimer, the term of this patent is extended or adjusted under 35 U.S.C. 154(b) by 276 days.

(21) Appl. No.: 13/416,389

(22) Filed: Mar. 9, 2012

(65) Prior Publication Data

US 2012/0231104 A1    Sep. 13, 2012

(30) Foreign Application Priority Data

Mar. 10, 2011    (JP) ................... 2011-053575
Mar. 10, 2011    (JP) ................... 2011-053582

(51) Int. Cl.
*B29C 45/00*    (2006.01)

(52) U.S. Cl.
USPC ........................................................ 425/200

(58) Field of Classification Search
CPC   B29C 31/063; B29C 45/0084; B29C 45/021; B29C 45/231
USPC ........................................................ 425/200
See application file for complete search history.

(56) References Cited

U.S. PATENT DOCUMENTS 5,551,486 A * 9/1996 Hauser et al. ............... 264/328.4
7,476,094 B2 * 1/2009 Hanot ........................... 425/132

FOREIGN PATENT DOCUMENTS

JP          2006205660          8/2006

* cited by examiner

*Primary Examiner* — Alison Hindenlang
(74) *Attorney, Agent, or Firm* — Adams & Wilks (57) ABSTRACT

A liquid resin material molding system includes a mold, a mold clamping device for clamping the mold, and a supply device for supplying a liquid resin material to the mold. The supply device includes an agitation-mixing mechanism for agitation-mixing of a liquid resin material of an additive added to a main component, a pump mechanism for feeding the liquid material mixture obtained thereby, and a fixed-quantity metering/supply mechanism for metering a fixed quantity of the liquid material mixture fed thereto via a first flow passage by the pump mechanism, for intermittent supply to the mold through a second flow passage.

7 Claims, 12 Drawing Sheets

LIQUID RESIN MATERIAL MOLDING SYSTEM

FIELD OF THE INVENTION

The present invention relates to a liquid resin material molding system for supplying a liquid resin material to a mold and obtaining a molded article.

BACKGROUND OF THE INVENTION

Injection of a resin material from an injection device into a mold that has been clamped by a mold clamping device, to obtain a molded article, is commonly practiced. Resin pellets are typically employed as the resin material. The resin pellets are a granular solid so as to facilitate supply. The resin pellets are charged into a heating cylinder, where they undergo plasticization and kneading through heating and rotation of a screw, to obtain a fluidized material. This fluidized material is injected into a mold, and solidified to a molded article.

When the resin material is silicone rubber, the resin material takes the form of a liquid material prior to supply to the injection device. Such materials of liquid form prior to supply to the injection device are termed "liquid resin materials."

A two-pack liquid resin material is one example of such a liquid resin material. In a two-pack liquid resin material, one liquid is the main component, and the other liquid is an additive, typically a hardener. When the hardener is combined with the main component, the action of the hardener brings about hardening to a predetermined level of hardness, within several hours to several tens of hours at normal temperature, or several tens of seconds to several tens of minutes at molding temperature.

When a hardener is used, it is recommended to add the hardener as late as possible, in order to avoid clogging of the flow channel. Such a liquid resin material supply device is disclosed in, for example, Japanese Patent No. 4373932. The configuration of the liquid resin material supply device will be described with reference to FIG. 11.

Figure 11:
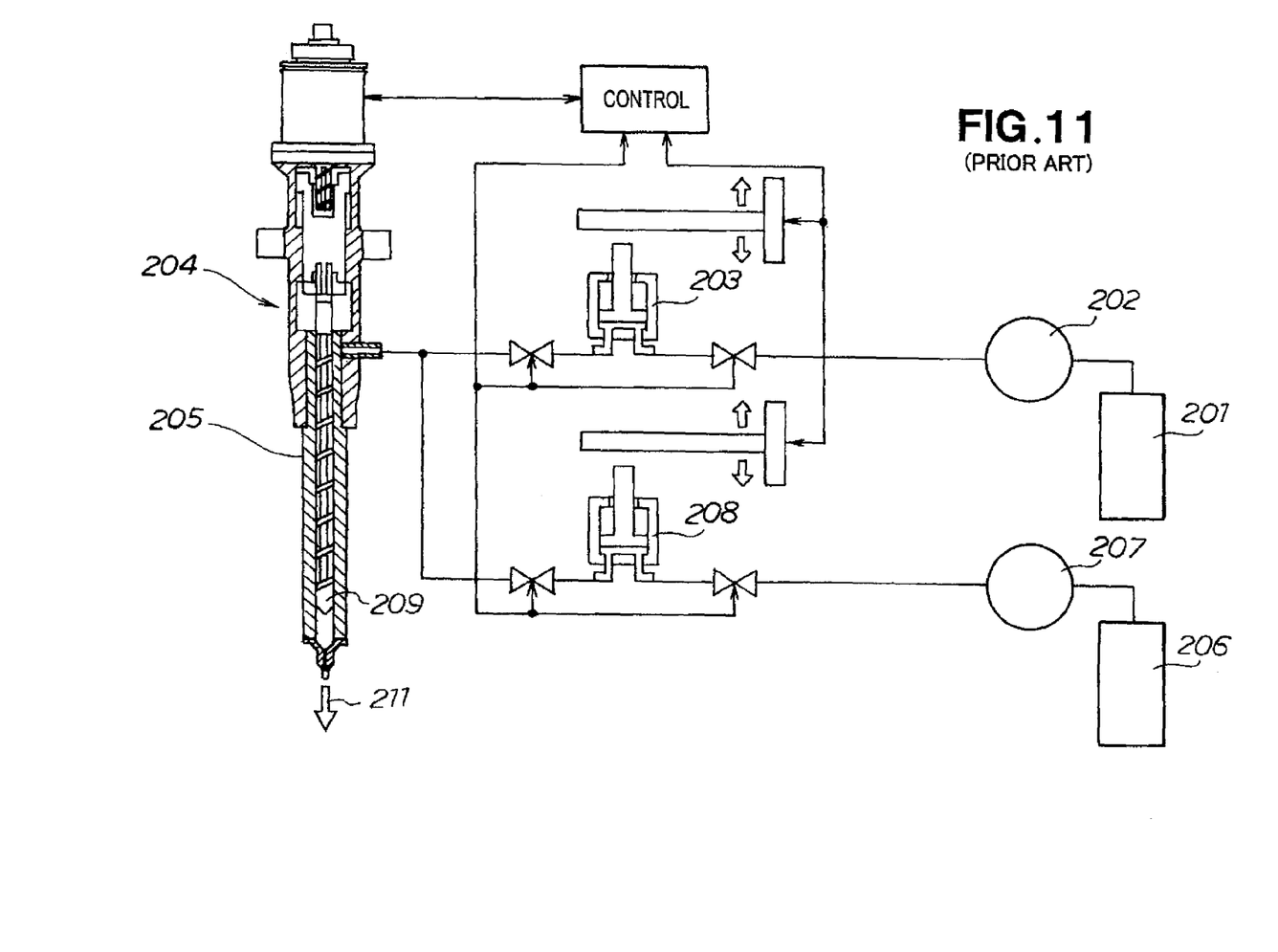
FIG. 11 is a diagrammatical view illustrating a conventional liquid resin material supply device.

FIG. 11 is a principle diagram of a prior art liquid resin material supply device. A main component 201 is fed to a metering cylinder 203 by a pump 202. After being metered by the metering cylinder 203, the main component 201 is supplied to a heating cylinder 205 of an injection device 204. Additionally, a hardener 206 is fed to a metering cylinder 208 by a pump 207. After being metered by the metering cylinder 208, the hardener 206 is supplied to the heating cylinder 205 of the injection device 204. The main component 201 and the hardener 206 are kneaded by a screw 209 in the heating cylinder 205, and thereafter injected as shown by an arrow 211.

However, the liquid resin material supply device disclosed in Japanese Patent No. 4373932 necessitates the injection device 204. Because the injection device 204 is expensive, the device cost of the liquid resin material supply device is greater. Also, in the injection device 204, mixing is accomplished by a screw 209, and there is a risk that the screw 209 will fail to mix the material thoroughly. Further, during mixing by the screw 209, outside air may get sucked into the heating cylinder 205, posing a concern that air bubbles will remain in the molded article. Thus, the fact that the injection device 204 is necessary gives rise to a number of problems.

Accordingly, there exists a need for a liquid resin material molding system that does not require an injection device, and that affords thorough mixing of material without air bubbles getting entrained therein.

SUMMARY OF THE INVENTION

According to a first aspect of the present invention, there is provided a liquid resin material molding system which comprises: an agitation-mixing mechanism for agitation-mixing of a liquid resin material having an additive added to a main component; a pump mechanism for feeding a liquid material mixture obtained thereby; a fixed-quantity metering/supply mechanism for metering a fixed-quantity of the liquid material mixture fed thereto, and delivering the mixture to a downstream stage; a mold for obtaining a molded article from the liquid material mixture supplied by the fixed-quantity metering/supply mechanism; and a mold clamping device for clamping the mold, wherein the fixed-quantity metering/supply mechanism comprises: a body provided with a pot for storing the liquid material mixture fed by the pump mechanism, an inflow port through which the liquid material mixture is introduced into the pot, and an outflow port through which the liquid material mixture is discharged from the pot; a plunger displaceably attached to the body; plunger pushing means, furnished to the body, for pushing the plunger in an advancing direction; a first flow passage connecting the pump mechanism and the inflow port; an inflow valve, furnished to the first flow passage, for opening and shutting the first flow passage; a second flow passage connecting the outflow port and the mold; and an outflow valve, furnished to the second flow passage, for opening and shutting the second flow passage, the inflow port is furnished to a region offset towards the plunger pushing means from the outflow port, in an axial direction of the plunger, and the plunger is furnished with a material flow passage for directing the liquid material mixture supplied from the inflow port to a distal end of the plunger, even when the plunger is placed at a maximum advance position.

In the present invention, there is provided an agitation-mixing mechanism adapted for thorough agitation-mixing of a liquid resin material of a hardener or other additive added to a main component. The agitation-mixing mechanism ensures the materials are not inadequately mixed.

The fixed-quantity metering/supply mechanism is provided with a body having a pot for storing the liquid material mixture fed by the pump mechanism, an inflow port for introducing the liquid material mixture into the pot, and an outflow port for discharging the liquid material mixture from the pot; and a plunger displaceably attached to the body. The inflow port is furnished to a region offset towards the plunger pushing means from the outflow port, in the axial direction of the plunger, and the plunger is furnished with a material flow passage for directing the liquid material mixture supplied from the inflow port to the distal end of the plunger, even with the plunger at the position of maximum advance.

The liquid material mixture has a tendency for a portion thereof to accumulate at the inflow port. The collected material hardens, and must be cleaned away.

In this regard, in the present invention, material in the vicinity of the inflow port is forcibly directed into the pot via the material flow passage furnished to the plunger. Therefore, no concerns are presented that material in the vicinity of the inflow port will accumulate in the vicinity of the inflow port.

Through adoption of this fixed-quantity metering/supply mechanism, the premixed liquid material mixture can be supplied directly to the mold from the fixed-quantity metering/supply mechanism. As a result, there is no need for an injection device.

According to the present invention, there is provided a liquid resin material molding system affording thorough mixing of material, with no need for an injection device.

Preferably, the agitation-mixing mechanism is provided with a vacuum pump for removing air bubbles from the liquid resin during agitation mixing. Because air bubbles can be removed from the liquid resin, the quality of molded articles can be improved.

Desirably, the plunger and the plunger pushing means are mutually separated. Because the plunger and the plunger pushing means are separated, the plunger pushing means can be retracted at high speed. Because the plunger is subjected to resin pressure independently, displacement thereof is smoother, and metering accuracy is improved.

In a preferred form, the second flow passage is detachably linked to the mold clamping device. By virtue of being detachable, a plurality of mold clamping devices and molds can be accommodated with a single second flow passage. Also, when a screw linkage is adopted for linking, the screw can prevent the distal end of the second flow passage from becoming dislodged from the injection port by pressure.

Preferably, the material flow passage is a helical groove furnished in a helical pattern to the outside peripheral face of the plunger. By virtue of the helical groove, flow passage resistance is greater than a straight groove, and backflow of the liquid material mixture is prevented.

It is preferred that the mold clamping device be provided with: an injection port to which the distal end of the second flow passage is linked, and through which the liquid material mixture is received; a runner extending from the injection port; a gate furnished at an end of the runner; a needle for opening and shutting the gate; and a drive mechanism for driving the needle. Control of supply in complex fashion can be accomplished by controlling the opening and shutting of the gates.

In a preferred form, the drive mechanism is equipped with: a driver member for pushing and advancing a basal portion of the needle; a drive member for displacing the driver member in a direction orthogonal to the direction of displacement of the needle; and an elastic member for urging the needle towards a retraction direction; and the driver member is provided with a pocket provided with a sloping portion for pushing the basal portion of the needle, the pocket allowing a retracting movement of the needle. The drive mechanism that advances the needle is disposed so as to extend in a direction orthogonal to the direction of displacement of the needle. The drive member can also be disposed on another face orthogonal of one face of the mold clamping device. Disposition in this fashion affords considerable freedom in disposition of the drive member. As a result, it is possible for the gates to be disposed in a more closely packed arrangement.

Additionally, an elastic member is provided for urging the needle towards the direction of retraction. The elastic member ensures that the valve is in the open state.

BRIEF DESCRIPTION OF THE DRAWINGS

Certain preferred embodiments of the present invention will be described in detail below, by way of example only, with reference to the accompanying drawings, in which.

DESCRIPTION OF THE PREFERRED EMBODIMENTS

Figure 1:
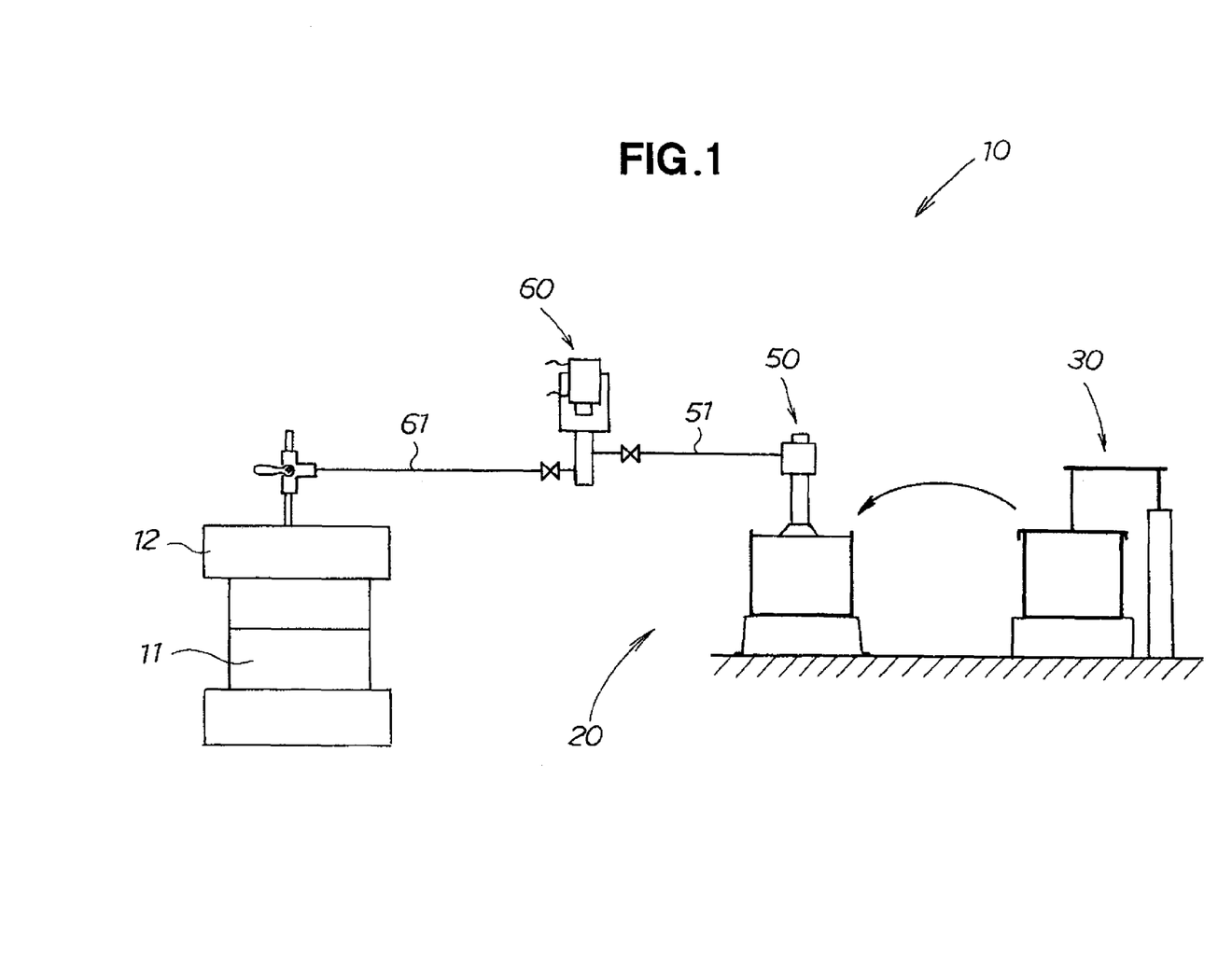
FIG. 1 is a diagrammatical view illustrating the principle of a liquid resin material molding system according to the present invention.

As shown in FIG. 1, the liquid resin material molding system 10 includes a mold 11, a mold clamping device 12 for clamping the mold 11, and a supply device 20 for supplying a liquid resin material to the mold 11.

The supply device 20 of the liquid resin material includes an agitation-mixing mechanism 30 for thorough agitation-mixing of a liquid resin material of an additive such as a hardener or the like added to a main component; a pump mechanism 50 for feeding the liquid material mixture obtained thereby; and a fixed-quantity metering/supply mechanism 60 for metering a fixed amount of the liquid material mixture fed from the pump mechanism 50 via a first flow passage 51, and supplying it intermittently to the mold 11 through a second flow passage 61.

Figure 2:
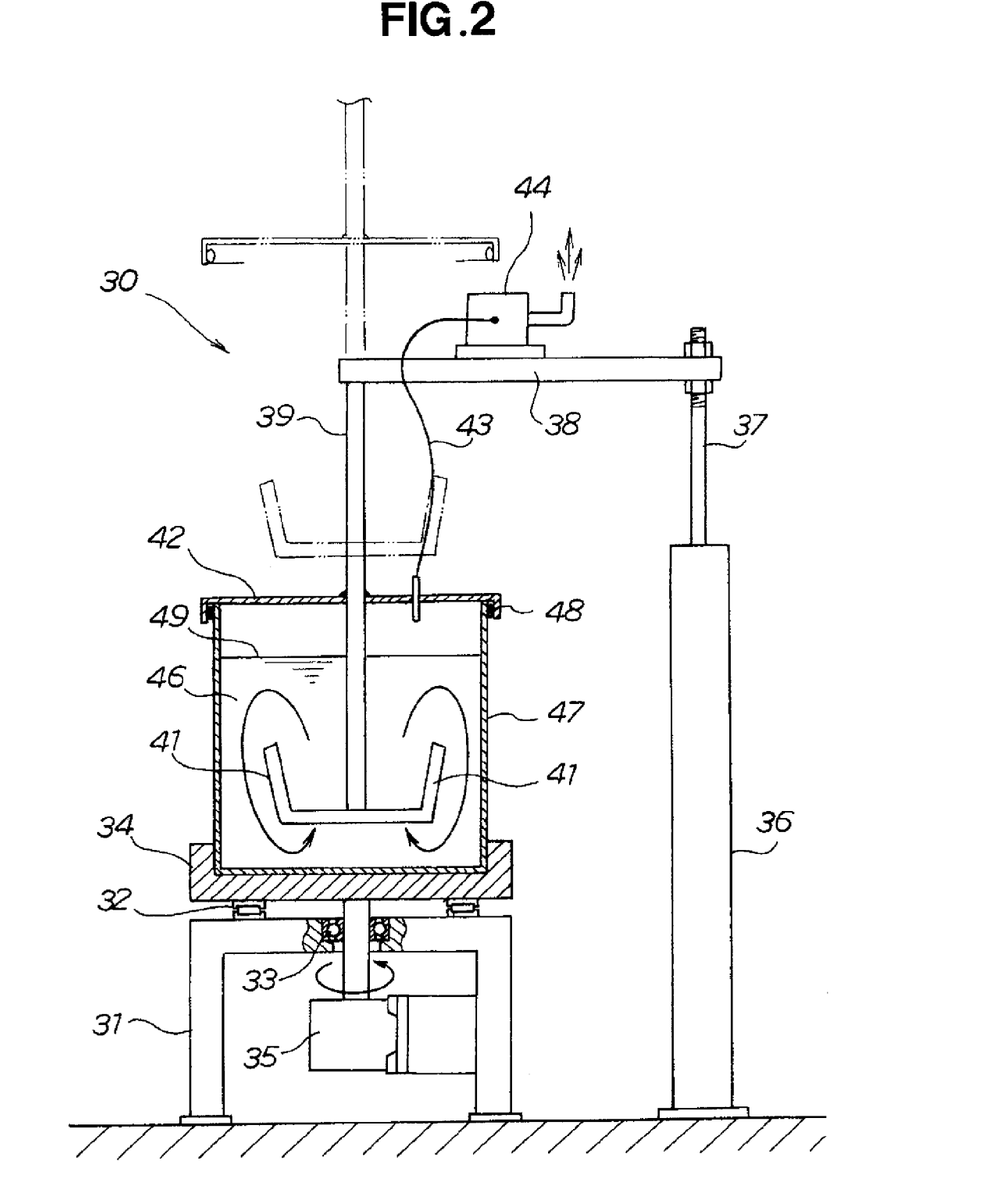
FIG. 2 is a schematic view illustrating the principle of an agitation-mixing mechanism constituting an element of the liquid resin material molding system.

As shown in FIG. 2, the agitation-mixing mechanism 30 includes, for example, a base stage 31; a rotating stage 34 rotatably resting on the base stage 31 via a thrust bearing 32 and a radial bearing 33; a reducer-equipped motor 35 attached to the base stage 31, for rotating the rotating stage 34; a cylinder 36 erected to the side of the base stage 31; a horizontally-extending lateral bar 38 secured to a piston rod 37 that extends upward from the cylinder 36; a rod 39 extending vertically downward from the distal end of the lateral bar 38; agitator blades 41, 41 of anchor shape secured to the bottom end of the rod 39; a lid 42 secured midway along the rod 39; a flexible hose 43 extending from the lid 42; and a vacuum pump 44 connected to the distal end of the flexible hose 43. The vacuum pump 44 rests on the lateral bar 38, but may be disposed at any position.

A receptacle 47 containing a liquid resin material 46 of an additive such as a hardener or the like added to a main component is rested on the rotating stage 34. Next, the rod 39 is lowered until the agitator blades 41, 41 are submerged in the liquid resin material 46. Next, the upper opening of the receptacle 47 is covered with the lid 42. Because the lid 42 has a sealing element 48 attached, the receptacle 47 is hermetically sealed by the lid 42.

The rotating stage 34 turns at a speed of about one rotation per second by the motor 35. Thereupon, the receptacle 47 rotates with respect to the stationary rotating blades 41, 41, and the liquid resin material 46 circles in the receptacle 47 in association therewith. At the same time, the interior of the receptacle 47 is brought to negative pressure (pressure below atmospheric pressure) by the vacuum pump 44.

Due to a relative rotation differential, upward- and downward-circulating flow arises in the liquid resin material 46, in addition to flow around the rod 39. The additive is uniformly mixed into the main component by this three-dimensional flow.

Air bubbles included in the liquid resin material 46 are pushed upward to the liquid surface 49 by the upward and downward circulating flow. Because the space between the lid 42 and the liquid surface 49 is at negative pressure, the air bubbles rise up from the liquid surface 49, and towards the vacuum pump 44.

Figure 3:
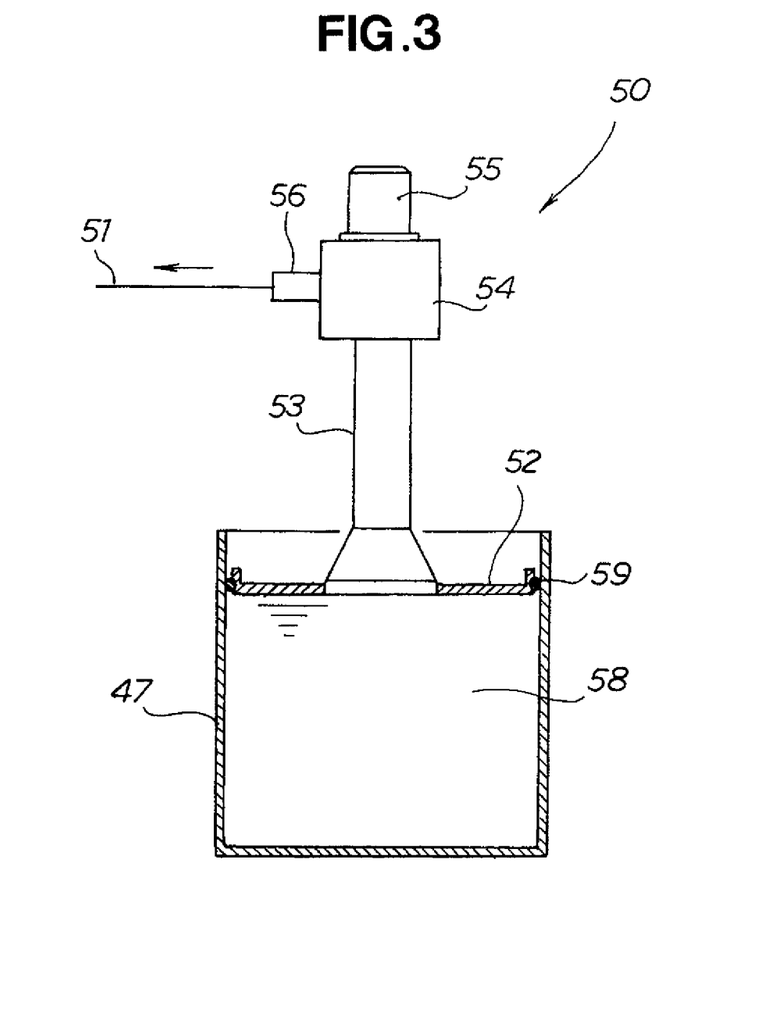
FIG. 3 is schematic view illustrating the principle of a pump mechanism constituting an element of the liquid resin material molding system.

The agitation-mixing mechanism 30 is termed a vacuum agitation mixer, and is adapted to remove air bubbles by a vacuum, and to promote mixing through agitation. Once agitation mixing for a predetermined time (including degassing) has been completed, the receptacle 47 is transferred to the next stage. The thoroughly mixed liquid resin material is termed a liquid material mixture. As shown in FIG. 3, the pump mechanism 50 is installed on the transferred receptacle 47.

As shown in FIG. 3, the pump mechanism 50 includes a disk 52 shaped like a drop-lid; an inlet tube 53 standing up from the center of the disk 52; a pump casing 54 connected to the top end of the inlet tube 53; a pump motor 55 secured to the upper face of the pump casing 54, and adapted to turn at high speed pump blades built into the pump casing 54; and a discharge tube 56 extending laterally from the pump casing 54.

Subsequent to thorough mixing, the content of the receptacle 47 constitutes a liquid material mixture 58.

The disk 52 is inserted from above into the receptacle 47, so as to rest on the upper surface (liquid surface) of the liquid material mixture 58. The disk 52 is equipped with a sealing element 59 such as an O-ring or the like, so that the disk 52 fits tightly against the inside peripheral face of the receptacle 47. The pump motor 55 is then started. The liquid material mixture 58 is discharged from the discharge tube 56. The upper surface of the liquid material mixture 58 drops in association with this discharge, but since the disk 52 drops together therewith, there is no concern that outside air will infiltrate below the disk 52, and air does not become admixed into the liquid material mixture 58.

The liquid material mixture 58 pressure-fed by the pump mechanism 50 is fed to the fixed-quantity metering/supply mechanism 60 via a first flow passage 51.

Figure 4:
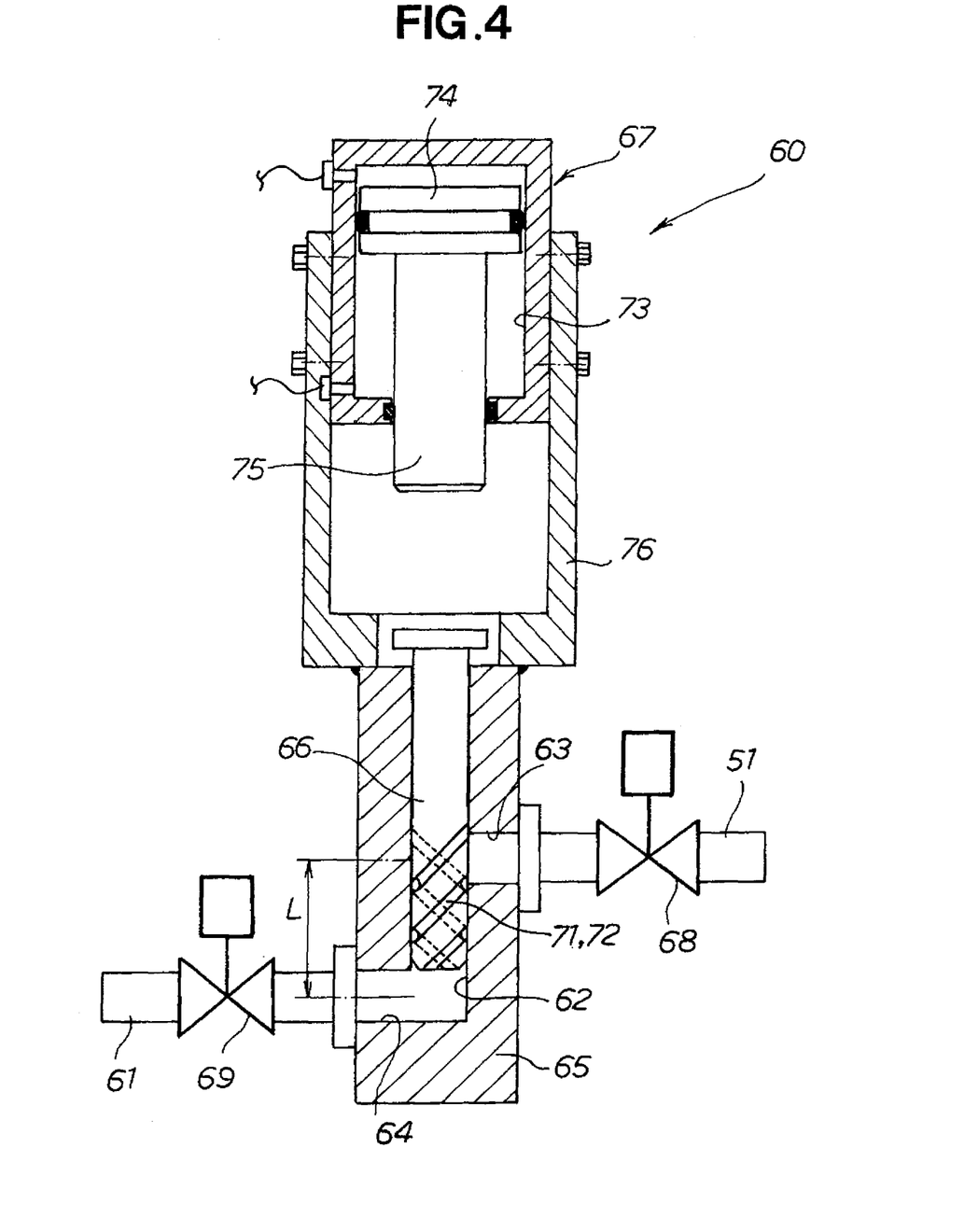
FIG. 4 is a schematic view illustrating, partly in section, the principle of a fixed-quantity metering/supply mechanism constituting an element of the liquid resin material molding system.

As shown in FIG. 4, the fixed-quantity metering/supply mechanism 60 includes a body 65 having a pot 62 for storing the liquid material mixture, an inflow port 63 for introducing the liquid material mixture into the pot 62, and an outflow port 64 for discharging the liquid material mixture from the pot 62; a plunger 66 displaceably attached to the body 65, and adapted to retract (rise in the drawing) due to the pressure of the liquid material mixture collected in the pot 62; plunger pushing means 67 furnished to the body 65, for pushing the plunger 66 in an advancing direction; an inflow valve 68 furnished to the first flow passage 51, for blocking or permitting flow of the liquid material mixture; and an outflow valve 69 furnished to a second flow passage 61, for blocking or permitting flow of the liquid material mixture.

The inflow port 63 is furnished to a region offset by a distance L towards the plunger pushing means from the outflow port 64, in the axial direction of the plunger 66.

Furthermore, the plunger 66 is furnished with a material flow passage 71 for directing the liquid resin material supplied from the inflow port 63 to the distal end of the plunger 66, even with the plunger 66 at the position of maximum advance.

The material flow passage 71 is ideally a helical groove 72 furnished in a helical pattern to the outside peripheral face of the plunger 66.

Owing to the helical groove 72, there is no concern of force being exerted in an axis-perpendicular direction on the plunger 66, and sliding resistance of the plunger 66 and the body 65 can be reduced.

Additionally, owing to the helical groove 72, flow passage resistance is greater than with a straight groove, and backflow of the liquid material mixture can be prevented.

The plunger pushing means 67 is ideally an air cylinder including a cylinder 73, a piston 74 housed in the cylinder 73, and a piston rod 75 extending from the piston 74. The plunger pushing means 67 is attached to the body 65 via a bracket 76.

Next, the action of the fixed-quantity metering/supply mechanism 60 is described.

In FIG. 4, when the outflow valve 69 is shut and the inflow valve 68 is opened, the liquid material mixture reaches the inflow port 63 through the first flow passage 51. The liquid material mixture 58 descends while circling along the helical groove 72, and collects below the plunger 66 in the drawing. If two helical grooves 72 are furnished at a pitch of 180°, a greater flow passage cross sectional area is gained, and forces in the axis-perpendicular direction cancel out, which is a preferable arrangement for the plunger 66.

The entire amount of the liquid material mixture from the inflow port 63 inflows to the helical groove 72. Therefore, no concern is presented that part of the liquid material mixture will accumulate and harden in proximity to the inflow port 63.

Furthermore, owing to the helical groove 72, flow passage resistance is greater than with a straight groove, and the liquid material mixture does not readily flow back, thus preventing backflow.

The plunger 66 is pushed upward by the pressure of the liquid material mixture collecting below the plunger 66 in the drawing. The amount of the liquid material mixture is determined by the product of the upward pushing stroke of the plunger 66, and the inside cross sectional area of the pot 62.

Figure 5A:
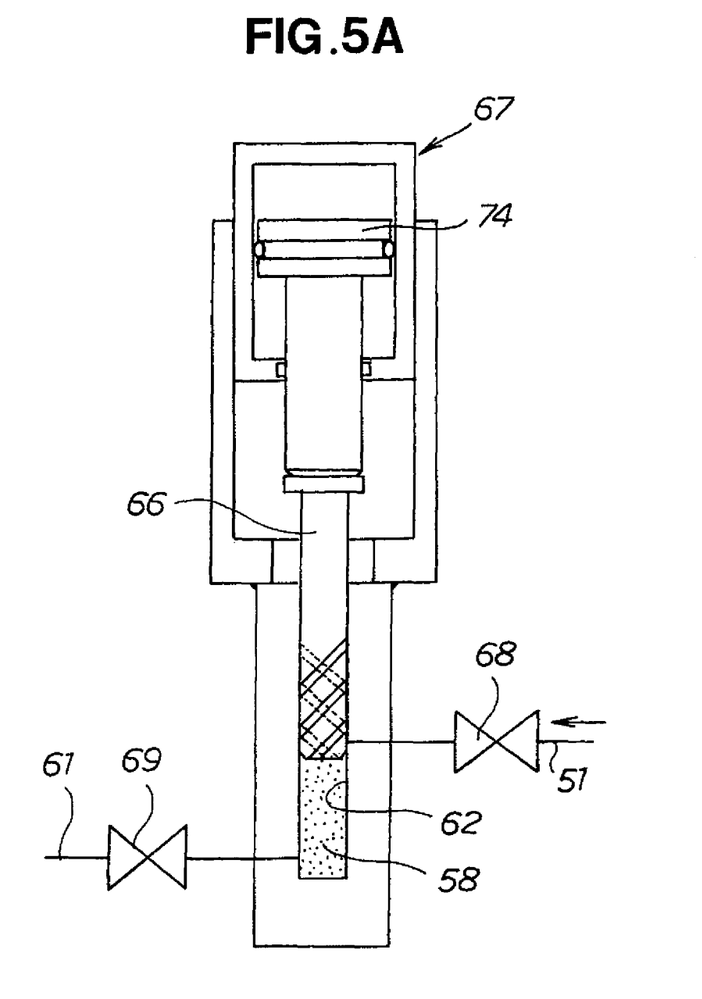
FIGS. 5A and 5B are views illustrating an operation of the fixed-quantity metering/supply mechanism.

As shown in FIG. 5A, at the point in time that a predetermined liquid material mixture 58 has collected, metering is completed, and the inflow valve 68 is shut.

Herein, the position of the inflow port 63 with the plunger 66 at maximum retraction is preferably one abutting the material flow passage 71. In so doing, the liquid material mixture 58 is constantly metered into the pot 62 through the material flow passage 71, and therefore hardening of the material due to accumulation of the material can be prevented in a reliable manner.

Figure 5B:
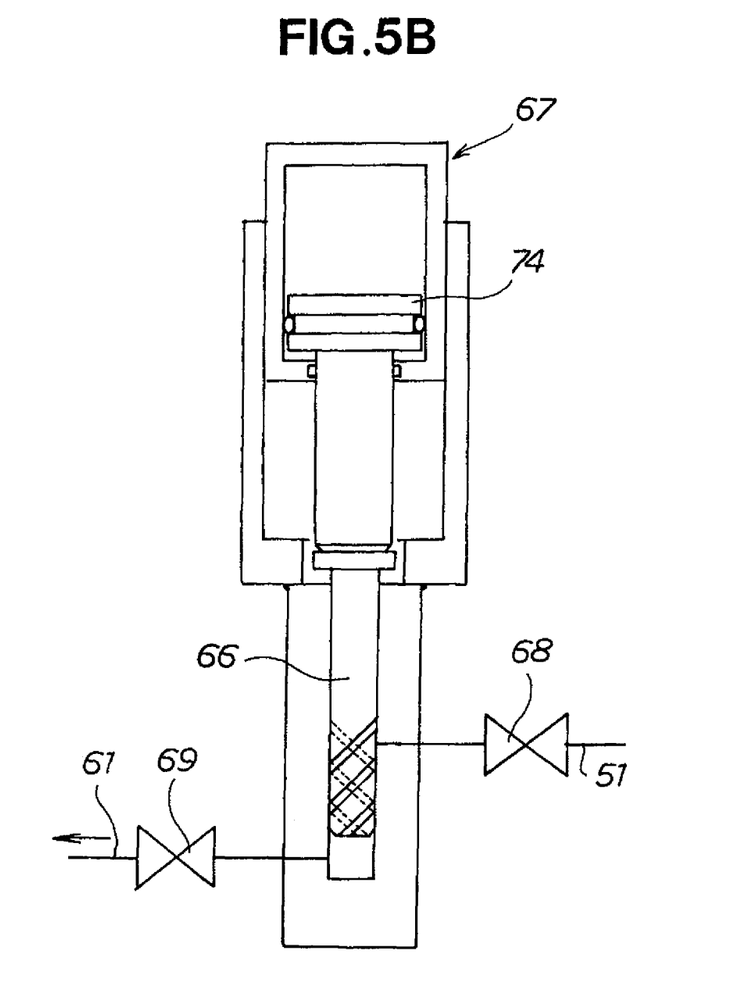

Next, to supply the material, the outflow valve 69 is opened, and the plunger 66 is advanced by the plunger pushing means 67.

Thereupon, the liquid material mixture is pushed into the second flow passage 61 as shown in FIG. 5B.

Once supply of the material has completed, the plunger pushing means 67 is retracted, and returns to the state shown in FIG. 4.

In FIG. 4, it is possible for the plunger 66 and the plunger pushing means 67 to be linked. However, where linked, the plunger 66 and the plunger pushing means 67 must be pushed back by the resin pressure, so displacement of the plunger 66 lacks smoothness, with adverse effects on metering accuracy.

In the present embodiment, the plunger 66 and the plunger pushing means 67 are separated, and therefore the plunger pushing means 67 can be retracted at high speed. Additionally, the plunger 66 is subjected to resin pressure independently; therefore, displacement thereof is smoother, and metering accuracy is improved.

Figure 6:
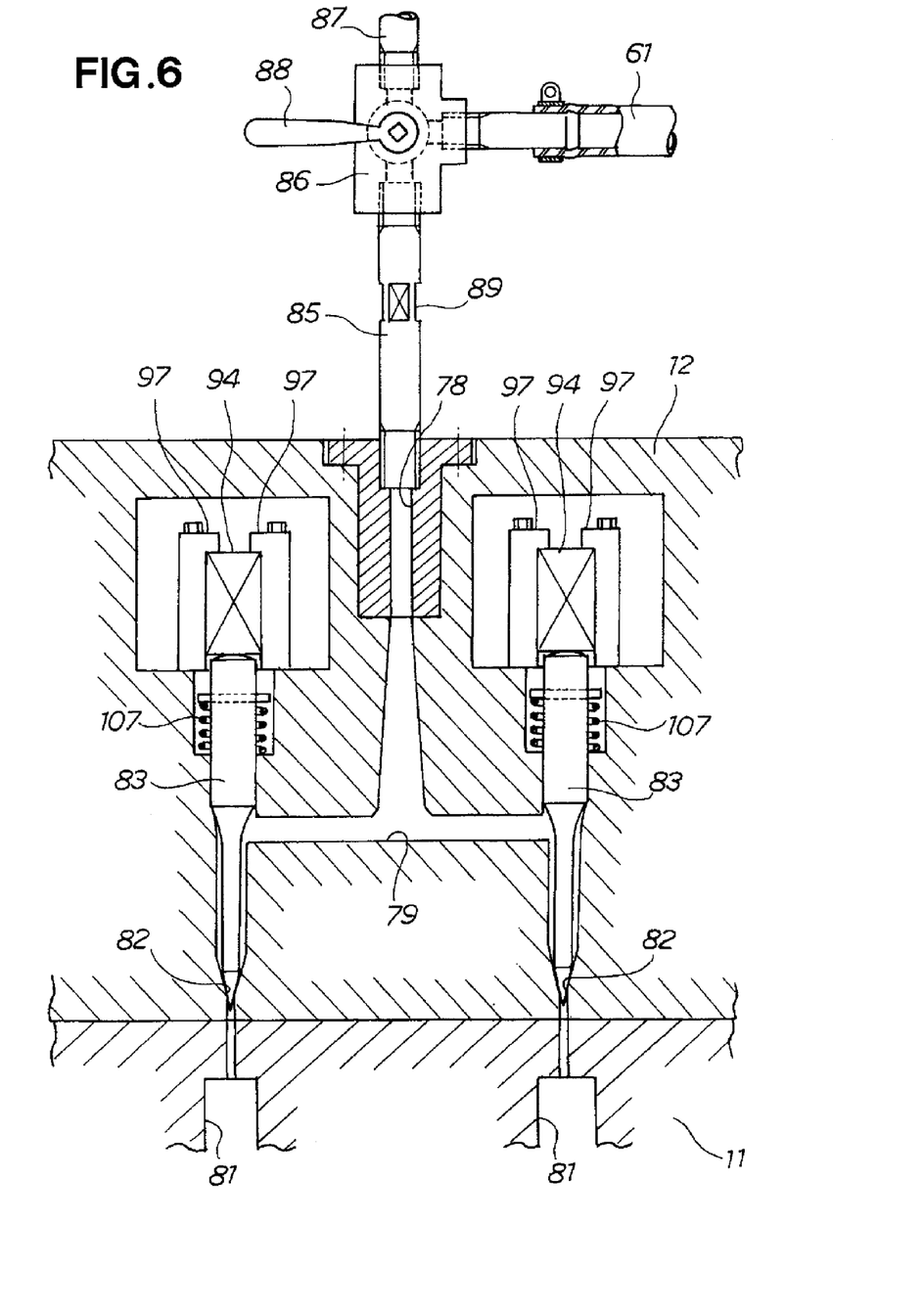
FIG. 6 is a fragmentary cross sectional view showing a mold clamping device constituting an element of the liquid resin material molding system.

Next, the relationship of the second flow passage 61, the mold clamping device 12, and the mold 11 is described.

As shown in FIG. 6, the mold clamping device 12 is furnished with an injection port 78; a runner 79 that extends from the injection port 78 and branches therefrom; gates 82, 82 leading from the runner 79 into cavities 81 on the mold 11 side; needles 83, 83 for opening and shutting the gates 82, 82; and a drive mechanism (indicated by reference symbol 90 in FIG. 7) for individually advancing the needles 83, 83.

The distal end of a linking tube 85 is threaded into the injection port 78. A three-way valve 86 has been previously attached to the basal part of the linking tube 85. Of the remaining two ports of the three-way valve 86, an atmospheric release tube 87 is connected to one of the ports, and the second flow passage 61 is detachably connected to the remaining port.

Through operation of a lever 88, there can be selected a first state in which only the second flow passage 61 and the linking tube 85 communicate, or a second state in which only the linking tube 85 and the atmospheric release tube 87 communicate.

In the material supply step, the first state is selected. The second state can be selected when carrying out a so-called air bleed.

With the second flow passage 61 in a state of being detached from the three-way valve 86, a tool engaging portion 89 is engaged by a tool such as a wrench, and the linking tube 85 is threaded into the injection port 78, or detached from the injection port 78.

Figure 7:
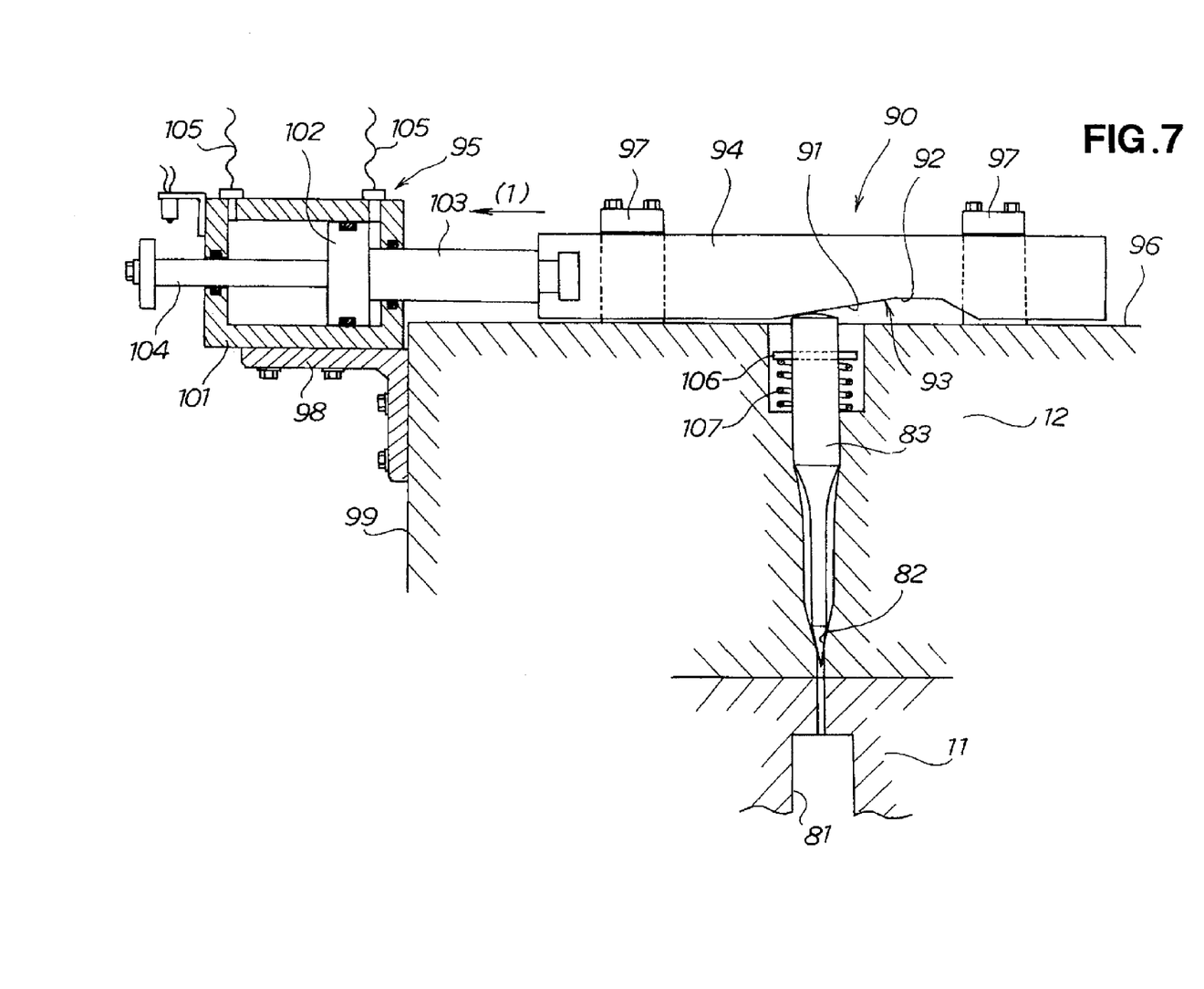
FIG. 7 is a fragmentary cross sectional view of the mold clamping device of FIG. 6.

As shown in FIG. 7, the drive mechanism 90 includes a driver member 94 having cam face 93 that includes a sloping portion 91 adapted to advance the needle 83 by pushing the basal portion thereof, and a pocket 92 for accommodating retracting movement of the needle 83; a drive member 95 for bringing about displacement of the driver member 94 in a direction orthogonal to the direction of displacement of the needle 83; and guide members 97, 97 furnished on a first face 96 of the mold 13, for preventing the driver member 94 from shifting in a direction other than the direction of displacement.

The drive member 95 is attached to another face 99 (a face orthogonal to the first face 96) of the mold 13 by an L fitting 98.

Ideally, the drive member 95 is, for example, an air cylinder unit including a cylinder 101, a piston 102 displaceably housed in the cylinder 101, a first piston shaft 103 and a second piston shaft 104 extending from the piston 102, and two air hoses 105, 105; however, a hydraulic cylinder or an electrically powered cylinder is also acceptable.

In preferred practice, the basal part of the needle 83 is furnished with a flange 106, and a compression coil spring 107 serving as the elastic member is interposed between the flange 106 and the mold clamping device 12, so that the needle 83 is urged towards the open valve position by the compression coil spring 107. Other types of elastic members besides compression coil springs are acceptable, such as rubber blocks.

In FIG. 7, when the drive mechanism 90 is initially disposed in the direction of displacement of the needles 83, the drive member 95 is centered on a first specific face (the upper face in FIG. 6) of the mold clamping device 12. This first face of the mold clamping device is furnished with an injection port (reference number 78 in FIG. 6) through which the resin material is injected, but the sites of the injection port and the drive member 95 are aligned, and the disposition of the drive member 95 is limited.

In the present invention, because the drive member 95 is disposed on the other face 99 orthogonal to the first face of the mold clamping device, there is greater freedom in disposition of the drive member 95. As a result, it is possible for the gates 82 to be disposed in a more closely packed arrangement.

Next, the action of the drive mechanism 90 having the above configuration is discussed.

In FIG. 7, the gate 82 is blocked by the needle 83. Next, in preparation for material supply, the drive member 94 is retracted by the drive member 95 (arrow (1)).

The action of the drive mechanism 90 shown in FIG. 7 will be described based on FIGS. 8A and 8B.

Figure 8A:
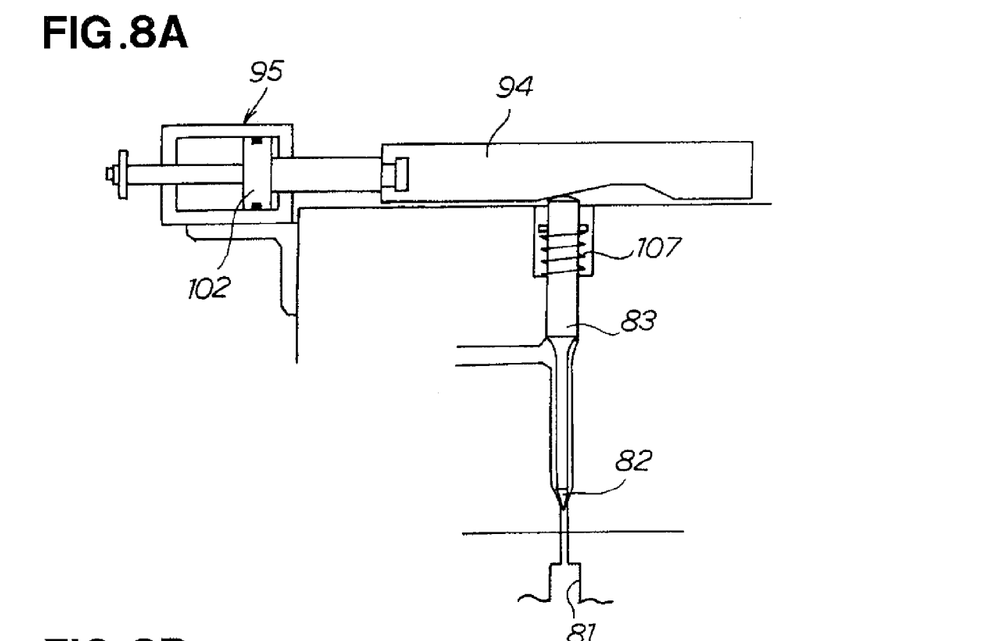
FIGS. 8A and 8B are schematic views illustrating an operation of the mold clamping device of FIG. 7.

FIG. 8A shows a shut valve state in which the needle 83 is advanced by the driver member 94.

Figure 8B:
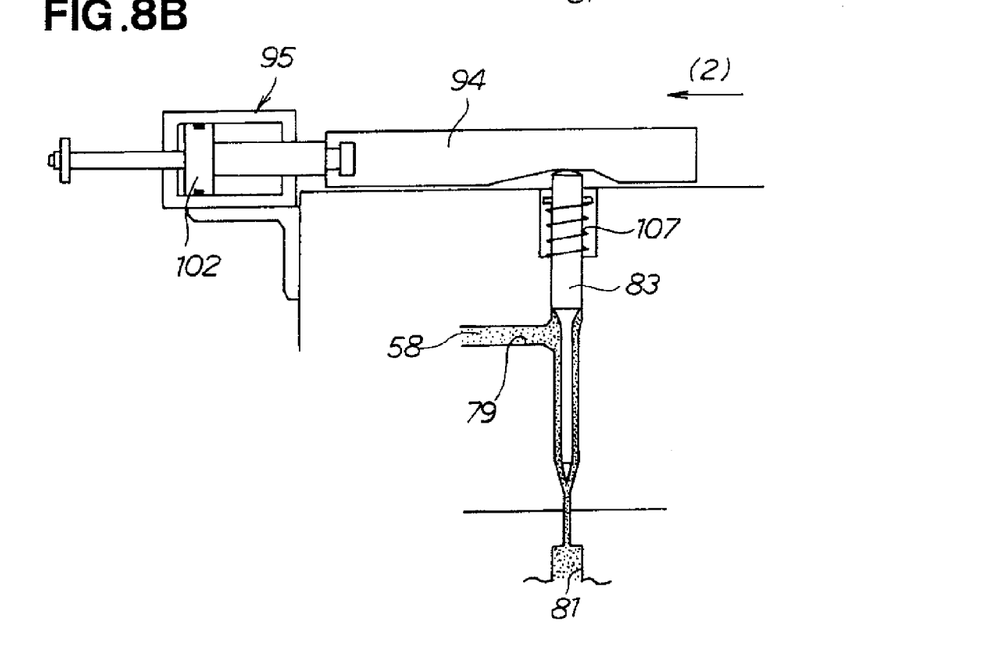

As shown in FIG. 8B, as the driver member 94 is displaced (arrow (2)) and the liquid material mixture 58 is supplied to the runner 79, the needle 83 retracts due to the net force of the supply pressure and the urging force of the compression coil spring 107, and enters the open valve state, whereupon the liquid material mixture 58 is supplied to the cavity 81.

Through the action of the compression coil spring 107, the open valve state may be obtained in a reliable manner, even in instances of low supply pressure of the liquid material mixture 58, affording a stable molding operation.

Figure 9:
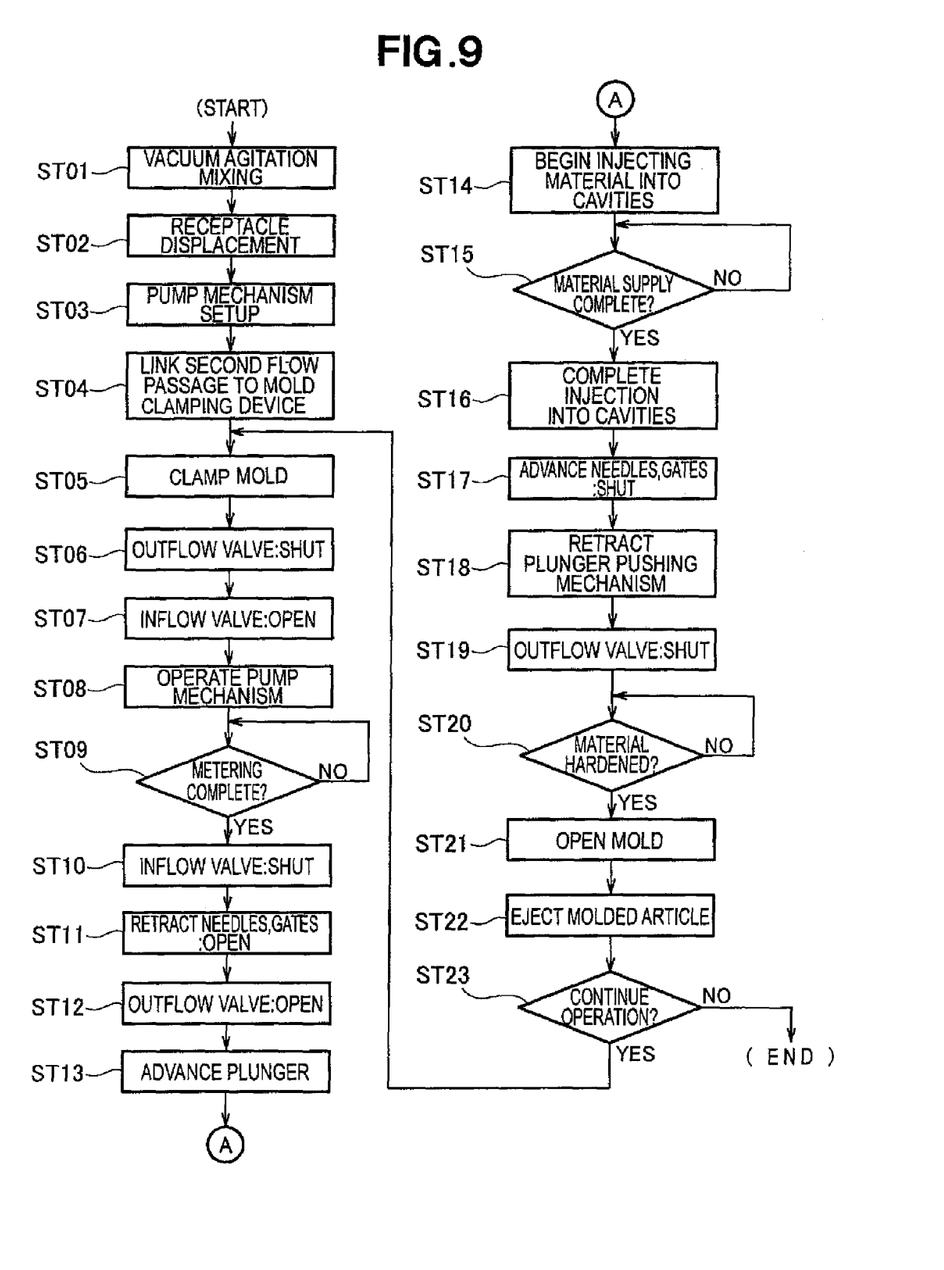
FIG. 9 is a flow diagram illustrating a method for forming a liquid resin material.

Next, the method of molding the liquid resin material is described based on FIG. 9.

As shown in FIG. 9, the liquid resin material undergoes thorough vacuum agitation mixing by the agitation-mixing mechanism provided with the vacuum pump (ST01). The receptacle is displaced (ST02), and the pump mechanism is positioned on the receptacle (ST03). Concurrently, the distal end of the second flow passage is linked to the mold clamping device (ST04). The preparation step is thereby concluded.

Next, the mold is shut, and closure of the mold is carried out by the mold clamping device (ST05).

The outflow valve is shut (ST06), the inflow valve is opened (ST07), and the pump mechanism is run to deliver the liquid material mixture (ST08). This step constitutes the delivery step.

The plunger retracts due to the pressure of the delivered liquid material mixture. Metering is determined to have completed when the plunger has retracted to a predetermined position, when the delivery time has reached a predetermined time, or when the pressure of the pot has reached a predetermined value during monitoring of this pressure (ST09), whereupon the inflow valve is shut (ST10). The fixed-quantity metering step is thereby concluded.

Next, through displacement of the driver member, the needles are retracted to the open valve state, opening the gates (ST11).

Next, the outflow valve is opened (ST12), and the plunger is advanced by the plunger pushing means (ST13). Thereupon, the liquid material mixture is injected into the cavities of the mold (ST14). When the plunger has advanced to the maximum limit of advance, or when the supply time has reached a predetermined time (ST15), the step of material injection (material supply) to the cavity is completed (ST16).

Once the material supply step is completed, the driver member is displaced to advance the needles to the shut valve state, shutting the gates (ST17).

Thereafter, the plunger pushing means is forcibly retracted (ST18).

Finally, the outflow valve is then shut (ST19). In so doing, a pressure bleed can be performed, the load on the mold clamping device and on the second flow passage can be reduced, and the life of the equipment can be extended.

Once a predetermined time has elapsed, the material inside the mold hardens (ST20). After hardening, the mold is opened (ST21), and the molded article is ejected, to obtain the molded article (ST22).

In ST23, if there is no need to continue operation, the flow terminates; or if operation needs to continue, the flow returns to ST05.

Next, a modification of the fixed-quantity metering/supply mechanism shown in FIG. 4 will be described with reference to FIG. 10.

Figure 10:
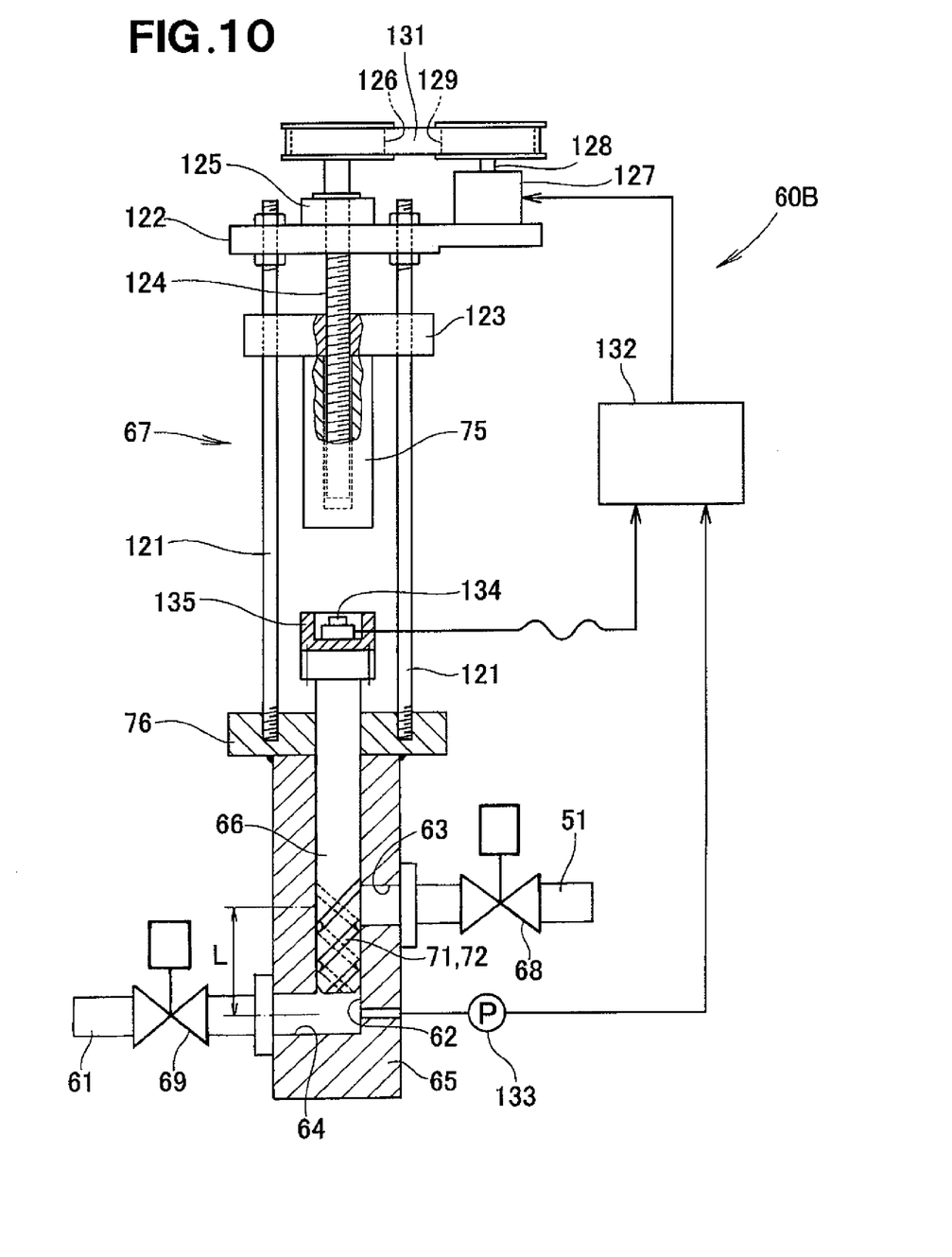
FIG. 10 is a diagram showing a modification of the fixed-quantity metering/supply mechanism of FIG. 4.

As shown in FIG. 10, the fixed-quantity metering/supply mechanism 60B includes a body 65 having a pot 62 for storing the liquid material mixture, an inflow port 63 for introducing the liquid material mixture into the pot 62, and an outflow port 64 for discharging the liquid material mixture from the pot 62; a plunger 66 displaceably attached to the body 65, and adapted to retract (rise in the drawing) due to the pressure of the liquid material mixture collected in the pot 62; plunger pushing means 67 furnished to the body 65, for pushing the plunger 66 in an advancing direction; an inflow valve 68 furnished to the first flow passage 51, for blocking or permitting flow of the liquid material mixture; and an outflow valve 69 furnished to a second flow passage 61, for blocking or permitting flow of the liquid material mixture.

The plunger pushing means 67 includes a bracket 76 furnished to the upper part of the body 65; a plurality of rods 121 standing up from the bracket 76; a top plate 122 secured to the upper ends of the rods 121; a nut 123 positioned below the top plate 122 and guided slidably upward and downward by the rods 121; a piston rod 75 integrally formed with the nut 123; a feed screw 124 threaded through the nut 123 and extending upward; a thrust bearing 125 furnished to the top plate 122 and rotatably supporting the feed screw 124; a driven pulley 126 furnished at the top end of the feed screw 124; a servo motor 127 furnished to the top plate 122; a drive pulley 129 attached to a motor shaft 128 of the servo motor 127; a belt 131 linking the drive pulley 129 and the driven pulley 126; and a controller 132 for controlling the servo motor 127.

Furthermore, a pressure gauge 133 for metering the pressure of the liquid material mixture in proximity to the outflow port 64 is attached to the body 65. A housing case 135 is secured to the top end of the plunger 66, and a proximity sensor 134 is housed in the housing case 135. The proximity sensor 134 detects a state of contact of the piston rod 75 and the housing case 135.

The action of the fixed-quantity metering/supply mechanism 60B having this configuration is discussed next.

The piston rod 75 waits at a predetermined position, specifically, a metering completion position that has been established beforehand. As the plunger 66 is pushed upward by the liquid material mixture, and the housing case 135 and the piston rod 75 come into contact, this contact is detected by the proximity switch 134, which detects that the plunger 66 has reached a predetermined position. If detection error by the proximity switch 134 is a concern, detection errors may be prevented by concomitantly relying on detection by the proximity switch 134 and completion of a predetermined clock time; or by adopting highly accurate position detection means in place of the proximity switch 134. Through detection in this manner, it is determined that metering has been completed. The inflow valve 68 is shut, and the outflow valve 69 is opened. The servo motor 127 outputs a first torque which is a predetermined torque, thereby lowering the piston 75. Thereupon, the plunger 66 advances, and the liquid material mixture is supplied to the mold via the second flow passage 61. During this supply, the pressure of the liquid material mixture is measured by the pressure gauge 133, and sent to the controller 132. When the pressure of the liquid material mixture reaches a predetermined pressure, the controller 132 controls the servo motor 127 to effect a change to a second torque lower than the first torque. This control is termed pressure maintenance control. When the plunger 66 advances to the limit of advance, or when the supply time has reached a predetermined time, material injection (the material supply step) into the cavity is completed.

Specifically, where the fixed-quantity metering/supply mechanism 60B is adopted, part of the flow shown in FIG. 9 is modified as follows.

Completion of metering in ST06 of FIG. 9 is decided upon by detection of contact of the plunger and the piston rod by the proximity switch.

Whereas for convenience, the embodiment of the present invention described simultaneous control of opening and shutting a plurality of needles, the aforedescribed embodiment is not limited thereto. In specific terms, where a plurality of needles is disposed as shown in FIG. 6, control of opening and shutting of the needles can be performed individually, and depending on differences in the size or shape of the cavities, injection into one or the other may be carried out with precedence; or the timing for closure may be staggered. Therefore, control of supply in complex fashion can be accomplished even in the absence of an injection device.

The drive mechanism 90 described in FIGS. 7 and 8 merely shows one preferred example. Specifically, the elastic members 107 may be dispensed with, and, instead, the needles may be displaced towards the open direction by the resin pressure; or a cylinder unit may be disposed coaxially with the needle 83, and opening and shutting of the needle 83 controlled by the cylinder unit. Accordingly, any desired structure may be adopted for the drive mechanism 90.

Further, whereas in the embodiment, a two-pack liquid resin material of a hardener or other additive added to a main component was adopted as the liquid material mixture 58, configurations of three or more packs in which a further coloring agent or the like is added are also acceptable. In place of the two-pack liquid resin material, a coloring agent may be added to a one-pack liquid resin material of a hardener pre-added to a main component.

Obviously, various minor changes and modifications of the present invention are possible in light of the above teaching. It is therefore to be understood that within the scope of the appended claims the invention may be practiced otherwise than as specifically described.

What is claimed is:

1. A liquid resin material molding system comprising:
    an agitation-mixing mechanism for agitation-mixing of a liquid resin material having an additive added to a main component;
    a pump mechanism for feeding a liquid material mixture obtained thereby;
    a fixed-quantity metering/supply mechanism for metering a fixed quantity of the liquid material mixture fed thereto, and delivering the mixture to a downstream stage;
    a mold for obtaining a molded article from the liquid material mixture supplied by the fixed-quantity metering/supply mechanism; and
    a mold clamping device for clamping the mold,
    wherein the fixed-quantity metering/supply mechanism comprises:
        a body provided with a pot for storing the liquid material mixture fed by the pump mechanism, an inflow port through which the liquid material mixture is introduced into the pot, and an outflow port through which the liquid material mixture is discharged from the pot;

a plunger displaceably attached to the body;

plunger pushing means, furnished to the body, for pushing the plunger in an advancing direction;

a first flow passage connecting the pump mechanism and the inflow port;

an inflow valve, furnished to the first flow passage, for opening and shutting the first flow passage;

a second flow passage connecting the outflow port and the mold; and an outflow valve, furnished to the second flow passage, for opening and shutting the second flow passage, the inflow port is furnished to a region offset towards the plunger pushing means from the outflow port, in an axial direction of the plunger, and the plunger is furnished with a material flow passage for directing the liquid material mixture supplied from the inflow port to a distal end of the plunger, even when the plunger is placed at a maximum advance position.

2. The liquid resin material molding system of claim 1, wherein the agitation-mixing mechanism is provided with a vacuum pump for removing air bubbles from the liquid resin during agitation mixing.

3. The liquid resin material molding system of claim 1, wherein the plunger and the plunger pushing means are mutually separated.

4. The liquid resin material molding system of claim 1, wherein the second flow passage is detachably linked to the mold clamping device.

5. The liquid resin material molding system of claim 1, wherein the material flow passage is a helical groove furnished in a helical pattern to the outside peripheral face of the plunger.

6. The liquid resin material molding system of claim 1, wherein the mold clamping device is provided with: an injection port to which a distal end of the second flow passage is linked, and through which the liquid material mixture is received; a runner extending from the injection port; a gate furnished at an end of the runner; a needle for opening and shutting the gate; and a drive mechanism for driving the needle.

7. The liquid resin material molding system of claim 6, wherein the drive mechanism is equipped with: a driver member for pushing and advancing a basal portion of the needle; a drive member for displacing the driver member in a direction orthogonal to a direction of displacement of the needle; and an elastic member for urging the needle towards a retraction direction, and the driver member is provided with a pocket provided with a sloping portion for pushing the basal portion of the needle, the pocket allowing a retracting movement of the needle.

* * * * *